US008903778B2

(12) United States Patent
Kamdar

(10) Patent No.: US 8,903,778 B2
(45) Date of Patent: Dec. 2, 2014

(54) VISIBLE PERSONALIZATION

(71) Applicant: Yahoo! Inc., Sunnyvale, CA (US)

(72) Inventor: Gaurav Kamdar, Bangalore (IN)

(73) Assignee: Yahoo! Inc., Sunnyvale, CA (US)

( * ) Notice: Subject to any disclaimer, the term of this patent is extended or adjusted under 35 U.S.C. 154(b) by 0 days.

(21) Appl. No.: 13/653,582

(22) Filed: Oct. 17, 2012

(65) Prior Publication Data
US 2014/0108425 A1    Apr. 17, 2014

(51) Int. Cl.
*G06F 17/30* (2006.01)

(52) U.S. Cl.
USPC .......................................................... 707/673

(58) Field of Classification Search
USPC ................................................. 707/748, 751
See application file for complete search history.

(56) References Cited

U.S. PATENT DOCUMENTS

| | | | |
|---|---|---|---|
| 5,890,152 A * | 3/1999 | Rapaport et al. ....................... 1/1 |
| 8,327,266 B2 * | 12/2012 | Svendsen ....................... 715/716 |
| 8,380,710 B1 * | 2/2013 | Finne et al. ................... 707/723 |
| 8,661,031 B2 * | 2/2014 | Chandra ........................ 707/730 |
| 2007/0289022 A1 * | 12/2007 | Wittkotter ....................... 726/27 |
| 2008/0005101 A1 * | 1/2008 | Chandra ........................... 707/5 |
| 2008/0092062 A1 * | 4/2008 | Motsinger ...................... 715/753 |
| 2009/0007195 A1 * | 1/2009 | Beyabani ......................... 725/86 |
| 2009/0046101 A1 * | 2/2009 | Askey et al. ................... 345/470 |
| 2009/0049045 A1 * | 2/2009 | Askey et al. ....................... 707/7 |
| 2009/0055396 A1 * | 2/2009 | Svendsen et al. .................. 707/7 |
| 2009/0055759 A1 * | 2/2009 | Svendsen ...................... 715/764 |
| 2011/0307549 A1 * | 12/2011 | Motsinger ..................... 709/203 |
| 2012/0030699 A1 * | 2/2012 | Amin ............................... 725/28 |
| 2014/0095465 A1 * | 4/2014 | Chandra ....................... 707/706 |
| 2014/0189378 A1 * | 7/2014 | Hermerding et al. ......... 713/300 |

OTHER PUBLICATIONS

Singh, Sameer et al., Constraint-Driven Rank-Based Learning for Information Extraction, 4pgs., published prior to the filing of this application.
Barrera, Araly et al., A Ranking-Based Approach for Multiple-Document Information Extraction, 7pgs., published prior to the filing of this application.
Ji, Heng et al., Re-Ranking Summaries Based on Crossed-Document Information Extraction, 12pgs., published prior to the filing of this application.
Ailon, Nir et al., Preference-Based Learning to Rank, 25pgs., published prior to the filing of this application.
Downey, Doug et al., Sparse Information Extraction: Unsupervised Language Models to the Rescue, 8pgs., published prior to the filing of this application.

* cited by examiner

*Primary Examiner* — Baoquoc N To
(74) *Attorney, Agent, or Firm* — Brinks Gilson & Lione

(57) ABSTRACT

A system for effectively rating and/or dynamically generating one or more electronic media files with respect to information associated with a user, the user's preferences, and/or the user's past behavior with respect to electronic media.

20 Claims, 4 Drawing Sheets

VISIBLE PERSONALIZATION

BACKGROUND

1. Field

Example embodiments relate to personalized rating and generation of electronic media, such as personalized rating and generation of websites, emails, and voice or text messages.

2. Description of the Related Art

Dynamic generation of electronic media has become commonplace in information systems, such as in web and non-web based systems. For example, websites, such as Yahoo, have been dynamically generated for years. Often the dynamic generation of a webpage can be based on the user accessing the webpage. For example, a webpage may be generated according to the demographics of a user accessing the webpage. Also, for example, a webpage may be generated based on information a user enters into a web-based form (such as user preferences) or on the status of a user (such as where the user is a preferred member of a website).

Although some systems have achieved great success in generating electronic media that is more relevant to its viewers, there is room for improvement.

SUMMARY

Described herein is a system, such as a media relevancy system (MRS), for effectively rating and/or dynamically generating one or more electronic media files with respect to information associated with a user, the user's preferences, and/or the user's past behavior with respect to electronic media.

In one embodiment, the system includes an electronic device implemented method that includes receiving a request for a first electronic media file from a user and storing data associated with a second electronic media file associated with the first electronic media file. The method also includes evaluating the data associated with the second electronic media file with respect to the user, preferences of the user, or past behavior of the user. Further, the method includes generating a rating of the second electronic media file based at least partially on the evaluation of the data associated with the second electronic media file; and generating the first electronic media file with a reference to the second electronic media file and the rating of the second electronic media file.

In another embodiment, the system includes an electronic device implemented method that includes receiving a request from a user for an electronic media file and determining a particular rendering and rating of the electronic media file. The particular rendering and rating may be at least partially based on information associated with the user, preferences of the user, or past behavior of the user with respect to electronic media. The method further includes transmitting the particular rendering and rating of the electronic media file to the user.

In another embodiment, an electronic device includes an input device, a memory device, a processor, and an output device. The input device may be operable to receive a request for a first electronic media file from a user. The memory device may be operable to store data associated with a second electronic media file associated with the first electronic media file. The processor in conjunction with the memory device may be operable to: evaluate the data associated with the second electronic media file with respect to the user, preferences of the user, or past behavior of the user; generate a rating of the second electronic media file based at least partially on the evaluation of the data associated with the second electronic media file; and generate the first electronic media file with a reference to the second electronic media file and the rating of the second electronic media file. The output device may be operable to display to the user, the first electronic media file with a reference to the second electronic media file and the rating of the second electronic media file.

BRIEF DESCRIPTION OF THE DRAWINGS

The system may be better understood with reference to the following drawings and description. Non-limiting and non-exhaustive embodiments are described with reference to the following drawings. The components in the drawings are not necessarily to scale, emphasis instead being placed upon illustrating the principles of the invention. In the drawings, like referenced numerals designate corresponding parts throughout the different views.

DETAILED DESCRIPTION OF EXAMPLE EMBODIMENTS

Figure 1:
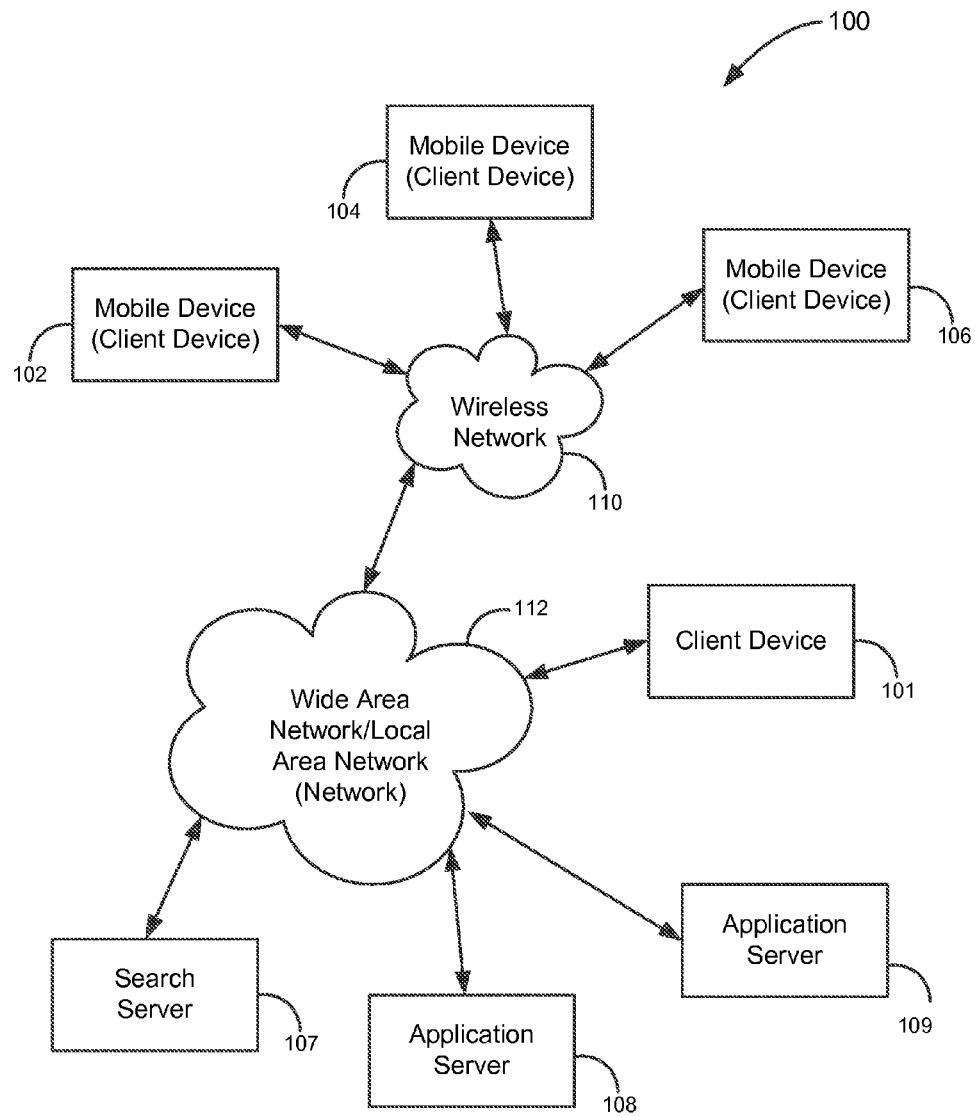
FIG. 1 illustrates a block diagram of one embodiment of a network that can implement one embodiment of a media relevancy system (MRS).

As mentioned above as an example, dynamic generation of webpages has become commonplace in the World Wide Web. Also, basing such dynamic generation on user information, such as demographic information, preferences, or status of a user, is prevalent.

Although some electronic media has achieved great success in being generated based on user information, there is room for improvement. For example, it would be beneficial for a website (or any other type of system generating electronic media) to effectively evaluate electronic media with respect to preferences of a user and then automatically rate and/or generate, based on those preferences, the electronic media; therefore, increasing the relevancy of the electronic media to the user.

Described herein is a system, such as a media relevancy system (MRS), for effectively rating and/or dynamically generating one or more electronic media files with respect to information associated with a user, the user's preferences, and/or the user's past behavior with respect to electronic media.

A rating of electronic media file may include one or more of text, voice messages, icons, video/images, and/or tactile information. The rating may be an alphanumeric rating such as a rating on a scale of one through five, may include reference to objects such as a rating on a scale of one through five stars, and/or may include additional information such as an automatically generated review of the media content. For example, with respect to a rating of a webpage, a review may mention that the website contains a percentage of irrelevant content such as advertisements that do not correspond to content of the remainder of the page. Also, in one embodiment, relevancy of electronic media may pertain to information associated with a user of the electronic media. For example, such information may include information associated with the user's web browsing or emailing history, user preferences (such as implicit and/or explicit user preferences with respect to a web browser and/or an email system), social media activity, blog activity, and/or the like. Also, such information may include demographic information associated with the user.

The dynamic generation of electronic media file may include, in addition to normal generation of the electronic media file, a rendering of a rating of the media, deletion or detraction of irrelevant content in the media, and/or enhancement of relevant content in the media. The relevancy of content may be of varying degree, so detraction and/or enhancement of content may vary accordingly. For example, text of a webpage or email may be sized with respect to its relevancy and/or correlation to information associated with a user, the user's preferences, and/or the user's past behavior. In one embodiment, the MRS may remove content of media that does not meet a relevancy and/or correlation threshold.

Alternatively or in addition to the dynamic generation, in one embodiment, a device generating the electronic media file may direct the user to more or most relevant content of the file. For example, in the case of a browser generating a webpage or email, the browser may move a cursor or the presentation of the page to the more or most relevant content of the webpage or email, with respect to a user, the user's preferences, and/or the user's past behavior.

Also, alternatively or in addition to the dynamic generation, in one embodiment, a device generating the electronic media file may also generate a button or link to move to more or most relevant content of the file. For example, in the case of a browser generating a webpage or email, the browser may also generate a button or link to move a cursor or a presentation of the page to the more or most relevant content of the webpage or email, with respect to a user, the user's preferences, and/or the user's past behavior.

In an example of generation of an email or chain of emails, a browser may open the email and list the number of occurrences of a user's name or another term of interest. This number of occurrences may occur directly on the email or on the browser. Also, a link or button may be included adjacent to the number, so that a user can jump to one of the occurrences of the term of interest by selecting the link or button.

As mentioned, the information associated with a user may include his or her name. Also, the information associated with a user may include residential and other contact information, demographic information (such as age, sex, and ethnicity), and the like.

The user's preferences may include recent and/or common search terms used by the user, interests of the user (such as academic interests, spiritual interests, entertainment or recreational interests, and work or career interests), preferred form of media delivery (such as various graphical, audio, video, and tactile forms of media delivery), parameters of the form of delivery (such as graphical parameters, which may include contrast, brightness, percentage of text to images), and preferred or tolerated percentage of advertisements within media.

The user's past behavior may include any past behavior with respect to electronic media and information systems. Any past behavior may include most recent or past source of electronic media used (such as most recent or past websites visited). Also, it may include most recent or past searches performed (such as most recent or past Internet searches or email searches). Further, any past behavior may include click-through rate or other web performance measurements per webpage, website, type of webpage or website, or quality of website (for example web performance measurements with respect to the user and varying degrees of advertising on a webpage or website). Also included, may be saves, flags, blocks, or deletions (such as saved, flagged, or deleted emails, saved, deleted, or blocked email addresses, and saved, bookmarked, or blocked webpages or websites). Flags may include urgency flags, "favorites" flags, low or high priority flags, and the like.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

The terminology used in the specification is for the purpose of describing particular embodiments only and is not intended to be limiting of example embodiments of the invention. In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Likewise, it will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof, and in the following description, the same reference numerals denote the same elements.

Now, in order to more specifically describe example embodiments of the present invention, various embodiments of the present invention will be described in detail with reference to the attached drawings. However, the present invention is not limited to the example embodiments, but may be embodied in various forms. In addition, the detailed is not intended as an extensive or detailed discussion of known concepts. As such, details that are known generally to those of ordinary skill in the relevant art may have been omitted or may be handled in summary fashion.

While example embodiments have been particularly shown and described with reference to FIGS. 1-4 it will be understood by one of ordinary skill in the art that various changes in form and details may be made therein without departing from the spirit and scope of example embodiments, as defined by the following claims.

FIG. 1 illustrates a block diagram of one embodiment of a network that can implement one embodiment of the MRS. As shown in FIG. 1, for example, a network 100 includes a variety of networks, such as local area network (LAN)/wide area network (WAN) 112 and wireless network 110, a variety of devices, such as client device 101 and mobile devices 102-106, and a variety of servers, such as application servers 108 and 109 (such as web, email, and/or messaging servers) and search server 107.

A network, such as the network 100, may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

A wireless network, such as wireless network 110, may couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Signal packets communicated via a network, such as a network of participating digital communication networks, may be compatible with or compliant with one or more protocols. Signaling formats or protocols employed may include, for example, Transmission Control Protocol/Internet Protocol (TCP/IP), User Datagram Protocol (UDP), or the like. Versions of the Internet Protocol (IP) may include IP version 4 (IPv4) or version 6 (IPv6).

The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

Figure 2:
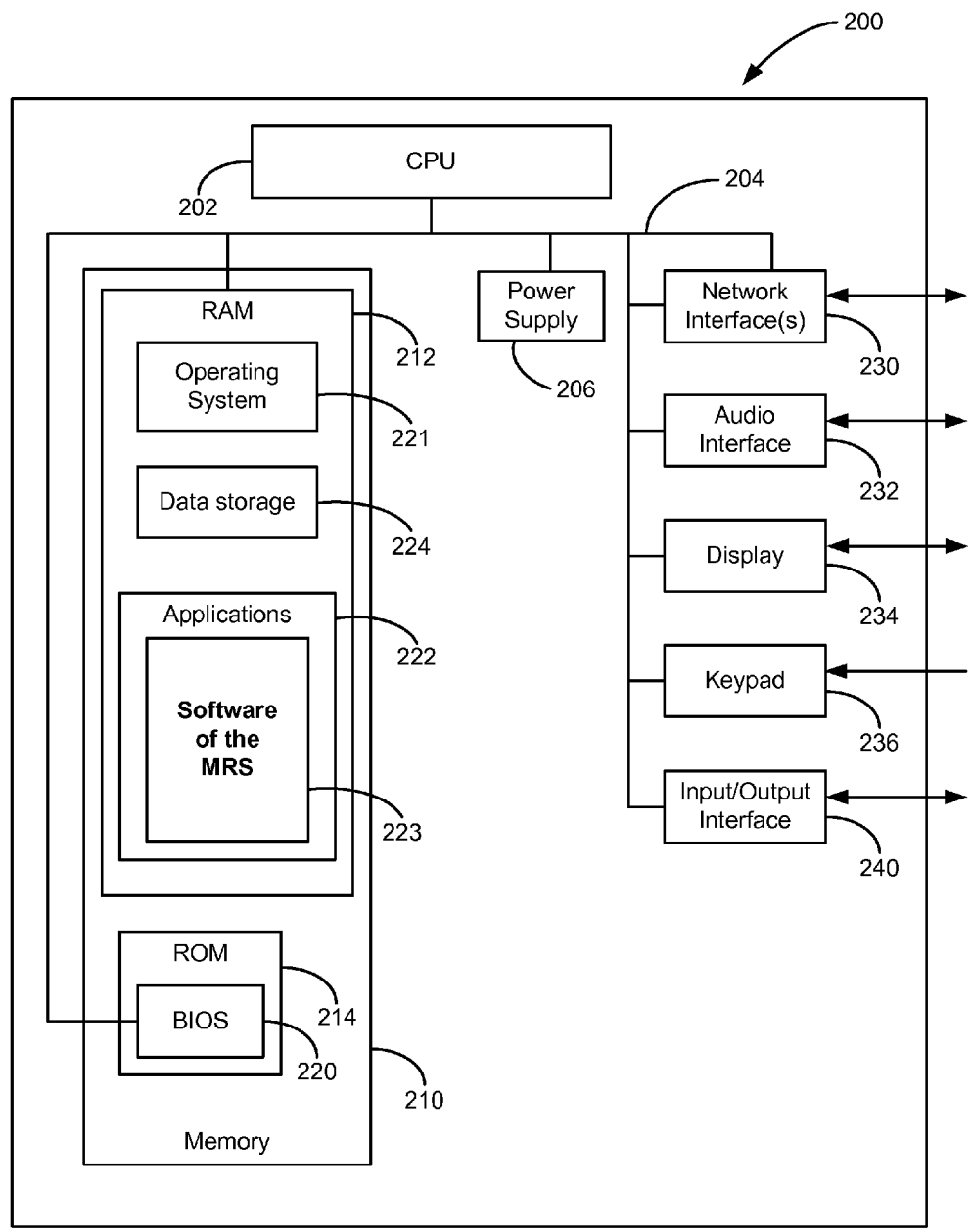
FIG. 2 illustrates a block diagram of one embodiment of an electronic device that can implement an aspect of one embodiment of a MRS.

FIG. 2 illustrates a block diagram of one embodiment of an electronic device 200 that can implement an aspect of one embodiment of the MRS. Instances of the electronic device 200 may include servers, such as servers 107-109, and client devices, such as client devices 101-106. A client device may be a desktop computer, a laptop computer, a tablet, or a smartphone, for example. In general, the electronic device 200 can include a processor 202, memory 210, a power supply 206, and input/output components, such as network interface(s) 230, an audio interface 232, a display 234, a key pad or keyboard 236, an input/output interface 240, and a communication bus 204 that connects the aforementioned elements of the electronic device. The network interfaces 230 can include a receiver and a transmitter (or a transceiver), and an antenna for wireless communications. The processor 202 can be one or more of any type of processing device, such as a central processing unit (CPU). Also, for example, the processor 202 can be central processing logic; central processing logic includes hardware, firmware, software and/or combinations of each to perform a function(s) or an action(s), and/or to cause a function or action from another component. Also, based on a desired application or need, central processing logic may include a software controlled microprocessor, discrete logic such as an application specific integrated circuit (ASIC), a programmable/programmed logic device, memory device containing instructions, or the like, or combinational logic embodied in hardware. Also, logic may also be fully embodied as software. The memory 210, which can include RAM 212 or ROM 214, can be enabled by one or more of any type of memory device, such as a primary (directly accessible by the CPU) and/or a secondary (indirectly accessible by the CPU) storage device (e.g., flash memory, magnetic disk, optical disk). The RAM can include an operating system 221, data storage 224, and applications 222, such as an embodiment of software of the MRS 223. The ROM can include BIOS 220 of the electronic device 200. The power supply 206 contains one or more power components, and facilitates supply and management of power to the electronic device 200. The input/output components can include any interfaces for facilitating communication between any components of the electronic device 200, components of external devices (such as components of other devices of the network 100), and end users. For example, such components can include a network card that is an integration of a receiver, a transmitter, and one or more I/O interfaces. A network card, for example, can facilitate wired or wireless communication with other devices of a network. In cases of wireless communication, an antenna can facilitate such communication. Also, the I/O interfaces, can include user interfaces such as monitors, keyboards, touchscreens, microphones, and speakers. Further, some of the I/O interfaces and the bus 204 can facilitate communication between components of the electronic device 200, and in one embodiment can ease processing performed by the processor 202.

Where the electronic device 200 is a client device, it can include a computing device capable of sending or receiving signals, such as via a wired or a wireless network. A client device may, for example, include a desktop computer or a portable device, such as a cellular phone telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like.

Also, a client device may vary in terms of capabilities or features. Claimed subject matter is intended to cover a wide range of potential variations. For example, a cell phone embodiment may include a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) or other location-identifying type capability, or a display with a high degree of functionality, such as a touch sensitive color 2D or 3D display, for example.

Further, a client device may include or may execute a variety of operating systems, including a personal computer operating system, such as a Windows, iOS or Linux, or a mobile operating system, such as iOS, Android, or Windows Mobile, or the like. A client device may include or may execute a variety of possible applications, such as a client software application enabling communication with other devices, such as communicating one or more messages regarding operation or configuration of the MRS. A client device may also include or execute an application to communicate content related to the MRS, such as, for example, textual content, multimedia content, or the like. A client device may also include or execute an application to perform a variety of possible tasks, such as browsing, searching, or analyzing forms of content related to the MRS.

Where the electronic device 200 is a server, it can include a computing device that is capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Further, a server may vary widely in configuration or capabilities, but generally, a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like. Particularly, the server may be an application server that includes a configuration to provide an application, such as one embodiment of the MRS, via a network to another device. Also, an application server may, for example, host a website that can provide a user interface for one embodiment of the MRS.

Further, an application server may provide a variety of services that include web services, third-party services, audio services, video services, email services, instant messaging (IM) services, short message service (SMS) services, multimedia messaging service (MMS) services, file transfer protocol (FTP) services, voice over IP (VOIP) services, calendaring services, photo services, or the like, all of which may work in conjunction with the MRS. Examples of content provide by the abovementioned applications, including one embodiment of the MRS, may include text, images, audio, video, or the like, which may be processed in the form of physical signals, such as electrical signals, for example, or may be stored in memory, as physical states, for example.

Figure 3:
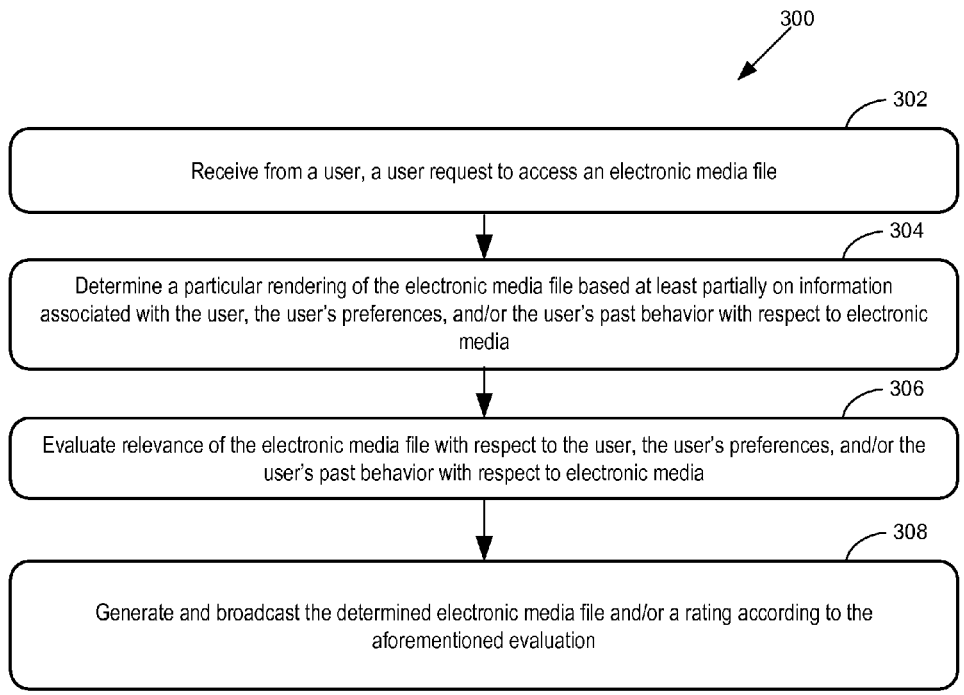
FIG. 3 illustrates a flowchart of an example method that can be performed by one or more aspects of one embodiment of a MRS.

FIG. 3 illustrates a flowchart of an example method that can be performed by one or more aspects of one embodiment of a MRS, such as the electronic device 200 (method 300). In short, the method 300 includes utilizing the information associated with a user, the user's preferences, and/or the user's past behavior with respect to electronic media to determine a particular rendering of an electronic media file (such as rendering of a webpage, streaming audio or video, voice or text message, or email). In one embodiment, the particular rendering may include removing or detracting less relevant content of the electronic media file (with respect to the information associated with a user, the user's preferences, and/or the user's past behavior with respect to electronic media). In another example, the particular rendering may include producing a rating of the electronic media file (with respect to the information associated with a user, the user's preferences, and/or the user's past behavior with respect to electronic media).

In one embodiment, a processor (e.g., the processor 202) can perform the method 300 by executing processing device readable instructions encoded in memory (e.g., the memory 210). In such an embodiment, the instructions encoded in memory may include a software aspect of the MRS.

The method 300 begins with a receiving aspect of an electronic device receiving a user request to access an electronic media file (at 302). For example, an electronic device (such as the electronic device 200) receives a request from a user to get data associated with a link, so that the user can access an electronic media file associated with the link. The user, for example, clicks on a hyperlink on a webpage, such as a hyperlink in a list of search results, and that clicking of the hyperlink results in a request for a URL included in the hyperlink that directs a web browser to execute browser executable code. In another example, the user clicks on a link to an email (such as in a list of emails), and that clicking of the email link results in a request for an email file.

Next, at 304, the method 300 continues with a first processing aspect of the electronic device determining a particular rendering of the electronic media file. For example, a particular rendering is determined for the user, based on the information associated with a user, the user's preferences, and/or the user's past behavior with respect to electronic media. Then the respective electronic media file renders accordingly. For example, on a webpage, where a user only tolerates a certain percentage of advertisements, the webpage will only display advertisements up to that percentage. In another example, a webpage, email, or message may be rendered so that it only includes a particular number of lines or words before and/or after the name of the user or a preferred word/term of the user (such as a recent or common search term). With respect to the last example, a word and/or term may include any alphanumeric or symbolic object, string, or word. A word and/or term may also include a sound, graphic, tactile expression, and/or the like.

Next, at 306, or upon receiving the electronic media file (not depicted), the method may continue with a second processing aspect (which may be the same aspect as the first processing aspect) evaluating the relevance of the electronic media file with respect to the user, the user's preferences, and/or the user's past behavior with respect to electronic media. Then, at 308, a third processing aspect (which may be the same aspect as the first processing aspect) may generate and broadcast the determined electronic media file and/or a rating according to the aforementioned evaluation. For example, on a webpage, the rating may be displayed on the webpage (such as at the top of the webpage) and/or on a part of a respective browser (such as on a tool bar, dashboard, or menu of a browser).

In one example, after the rendering of the electronic media file and/or rating, the user may interact with the file through an interface to modify its rendering or rating. For example, if the user does not agree with the rating for the electronic media, that user may adjust the rating. Also, for example, the user may revert any determined rendering of an electronic media file. Further, in one embodiment, such actions may be tracked and added to one or more profiles. Moreover, such profile(s) may also include the user's preferences and/or past behavior with respect to electronic media.

Figure 4:
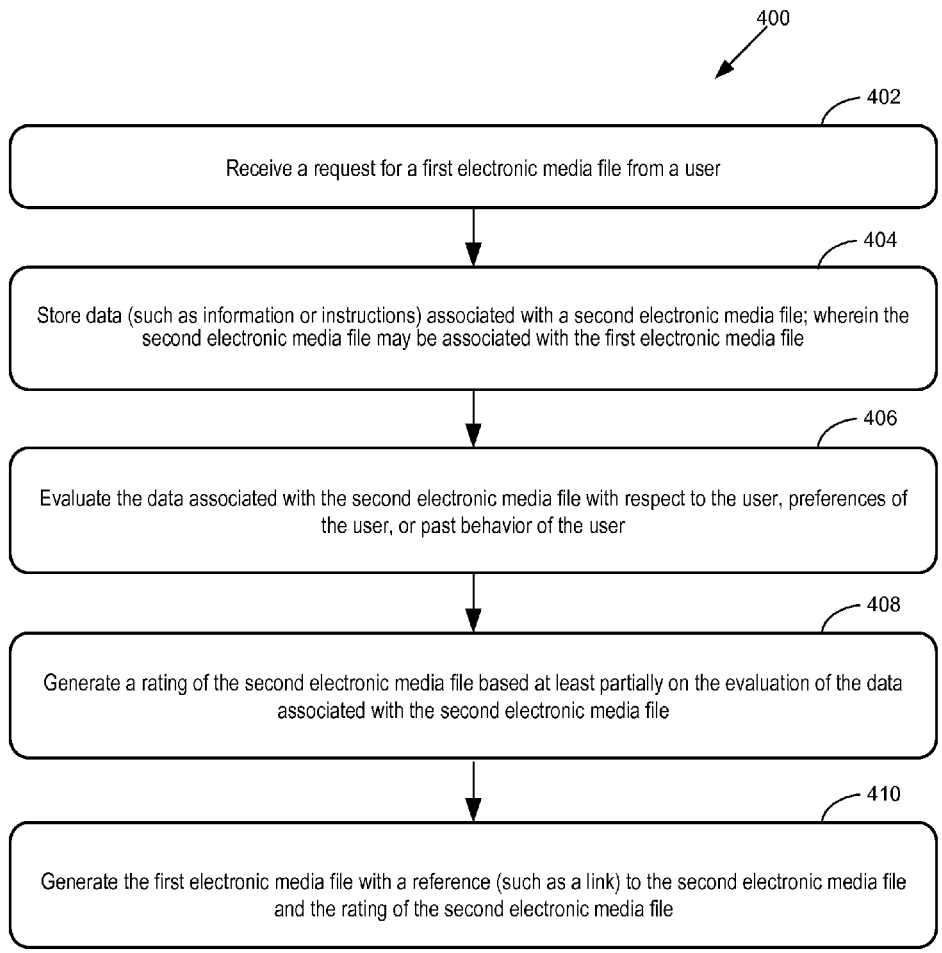
FIG. 4 illustrates a flowchart of another example method that can be performed by one or more aspects of one embodiment of a MRS.

FIG. 4 illustrates a flowchart of an example method that can be performed by one or more aspects of one embodiment of a MRS, such as the electronic device 200 (method 400). In short, the method 400 includes utilizing the information associated with a user, the user's preferences, and/or the user's past behavior with respect to electronic media to determine a particular rating of electronic media (such as a rating of a webpage, a streaming audio or video broadcast, a voice or text message, or an email). The method 400 may also include producing a link associated with the electronic media that may include or be adjacent to the particular rating.

In one embodiment, a processor (e.g., the processor 202) can perform the method 400 by executing processing device readable instructions encoded in memory (e.g., the memory 210). In such an embodiment, the instructions encoded in memory may include a software aspect of the MRS.

The method 400 begins with a receiving aspect of an electronic device receiving a request for a first electronic media file from a user (at 402). For example, the electronic device may receive a request for a first webpage, email, or voice or text message.

Next, at 404, a storing aspect of the electronic device stores data (such as information or instructions) associated with a second electronic media file; wherein the second electronic media file may be associated with the first electronic media file. For example, an electronic device may cache files (such as storing files already used) or pre-cache files (such as storing files expected to be used) associated with a second webpage, email, or voice or text message associated with the first webpage, email, or voice or text message.

Then, at 406, a first data processing aspect of the electronic device may evaluate the data associated with the second electronic media file with respect to the user, preferences of the user, or past behavior of the user. The evaluation of the user's past behavior may be with respect to his or her use of electronic media in general or with respect to use of specific instances and/or types of electronic media. For example, the electronic device may evaluate a second webpage, email, or voice or text message with respect to the user, preferences of the user, or past behavior of the user with respect use of the Internet, email, or voice or text messaging.

Next, at 408, a second data processing aspect of the electronic device (which may be the same aspect as the first data processing aspect) may generate a rating of the second electronic media file based at least partially on the evaluation of the data associated with the second electronic media file. In one embodiment, the evaluation of the data associated with the second electronic media file may be with respect to user information associated with the user accessing the second electronic media file. The user information may include information associated with the user's web browsing or emailing history, user preferences (such as implicit and/or explicit user preferences with respect to a web browser and/or an email system), social media activity, blog activity, and/or the like. Also, such information may include demographic information associated with the user.

Further, in one embodiment the rating may be stored or associated with the second electronic media file. For example, where the second electronic media file is a webpage or email, the rating may be displayed at or near the top of the webpage or email, at or in a respective link to the webpage or email, and/or at desired and/or relevant content in the webpage or email.

Then, at 410, a third data processing aspect (which may be the same aspect as the first data processing aspect) of the electronic device may generate the first electronic media file with a reference (such as a link) to the second electronic media file and the rating of the second electronic media file.

In one example, in the generation of the first electronic media file, a link and/or reference to the second electronic media file may include or be adjacent to the rating of the second electronic media file. In another example, in a first webpage, a link to a second webpage or a part of the first webpage may be displayed adjacent to a rating of the second webpage or the part of the first webpage. In another example, in a first email, a ranking of a second email (or another type of electronic media, such as a voice message) may be displayed adjacent to a displayed link to or reference of the second email. In yet another example, in a list of emails, rankings of the emails may be displayed adjacent to listings of emails, respectively.

Not depicted, subsequent to the generation of the first electronic media file, an output aspect of the electronic device (such as a display or speaker) may output the first electronic media file and the rating of the second electronic media file.

For example, such an aspect may display the file and rating on a display or transmit the file and rating via an audio or tactile signal.

As it can be imagined, there are various embodiments for providing and deriving the system described herein. It is therefore intended that the foregoing detailed description be regarded as illustrative rather than limiting, and that it be understood that it is the following claims, including all equivalents, that are intended to define the spirit and scope of this invention.

I claim:

1. An electronic device implemented A method, comprising:
   receiving, at a receiver, a request from a user for a first electronic media file;
   storing, in a non-transitory storage device, data associated with a second electronic media file associated with the first electronic media file;
   evaluating, by circuitry, the data associated with the second electronic media file with respect to the user, preferences of the user, past behavior of the user, or any combination thereof;
   generating, by the circuitry, a rating of the second electronic media file based at least partially on the evaluation of the data associated with the second electronic media file; and
   generating, by the circuitry, the first electronic media file with a reference to the second electronic media file and the rating of the second electronic media file.

2. The method of claim 1, wherein the first electronic media file, the second electronic media file, or both include includes a webpage.

3. The method of claim 1, wherein the first electronic media file, the second electronic media file, or both include includes an email.

4. The method of claim 1, wherein the first electronic media file, the second electronic media file, or both include includes a voice message, a text message, or both.

5. The method of claim 1, wherein the storing the data associated with the second electronic media file includes caching pre-caching, or both caching and pre-caching the data associated with the second electronic media file.

6. The method of claim 1, wherein the past behavior of the user includes use of a type of electronic media.

7. The method of claim 1, wherein the past behavior of the user includes use of a specific instance of electronic media.

8. The method of claim 1, wherein the reference to the second electronic media file includes a link to the second electronic media file.

9. The method of claim 1, wherein the generation of the first electronic media file includes generating the reference to the second electronic media file adjacent to the rating of the second electronic media file in a visual rendering of at least part of the first electronic media file.

10. The method of claim 1, wherein the reference to the second electronic media file includes the rating of the second electronic media file.

11. An electronic device, comprising:
    an input device operable configured to receive a request from a user for a first electronic media file;
    a memory device operable configured to store data associated with a second electronic media file associated with the first electronic media file;
    a processor in conjunction with the memory device operable configured to:
    evaluate the data associated with the second electronic media file with respect to the user, preferences of the user, past behavior of the user, or any combination thereof;
    generate a rating of the second electronic media file based at least partially on the evaluation of the data associated with the second electronic media file; and
    generate the first electronic media file with a reference to the second electronic media file and the rating of the second electronic media file; and
    an output device configured to display the first electronic media file with the reference to the second electronic media file and the rating of the second electronic media file.

12. The electronic device of claim 11, wherein the first electronic media file, the second electronic media file, or both include includes a webpage, an email, a voice message, a text message, or any combination thereof.

13. The electronic device of claim 11, wherein the memory device is operable configured to cache, pre-cache, or both cache and pre-cache the data associated with the second electronic media file.

14. The electronic device of claim 11, wherein the reference to the second electronic media file includes a link to the second electronic media file the rating of the second electronic media file, or both.

15. A non-transitory medium, comprising instructions executable by circuitry configured to:
    receive a request for a first electronic media file;
    store data associated with a second electronic media file associated with the first electronic media file;
    evaluate the data associated with the second electronic media file with respect to a user profile;
    generate a rating of the second electronic media file based at least partially on the evaluation of the data associated with the second electronic media file; and
    generate the first electronic media file with a reference to the second electronic media file and the rating of the second electronic media file.

16. The non-transitory medium of claim 15, wherein the user profile includes user preference information.

17. The non-transitory medium of claim 15, wherein the user profile includes biographical information.

18. The non-transitory medium of claim 15, wherein the user profile includes demographic information.

19. The non-transitory medium of claim 15, wherein the user profile includes user behavior information.

20. The non-transitory medium of claim 19, wherein the user behavior information includes use of a type of electronic media, a specific instance of electronic media, or both.

* * * * *